United States Patent [19]
Ohmura

[11] Patent Number: 5,901,492
[45] Date of Patent: May 11, 1999

[54] TOP GUIDE FOR FISHING ROD

[75] Inventor: Ryuichi Ohmura, Shizuoka, Japan

[73] Assignee: Fuji Kogyo Co., Ltd., Shizuoka, Japan

[21] Appl. No.: 09/014,701

[22] Filed: Jan. 28, 1998

[30] Foreign Application Priority Data

Jan. 28, 1997 [JP] Japan ................................. 9-029676

[51] Int. Cl.⁶ .............................................. A01K 87/04
[52] U.S. Cl. ............................................................ 43/24
[58] Field of Search ...................................... 43/24, 18.1

[56] References Cited

U.S. PATENT DOCUMENTS

| | | | |
|---|---|---|---|
| 3,060,618 | 10/1962 | Grishkin | 43/24 |
| 3,417,501 | 12/1968 | Fulop | 43/24 |
| 4,176,488 | 12/1979 | Ohmura | 43/24 |
| 4,196,537 | 4/1980 | Ohmura | 43/24 |
| 4,507,891 | 4/1985 | Ohmura | 43/24 |
| 4,586,285 | 5/1986 | Kim | 43/24 |

*Primary Examiner*—Thomas Price
*Attorney, Agent, or Firm*—Evenson, McKeown, Edwards & Lenahan, P.L.L.C.

[57] ABSTRACT

In a top guide having a bridge, if a length of the bridge is increased and the slant of the bridge is made gentle in order to enhance the entangled fishing line release effect, the weight is increased, and it is necessary to increase the thickness of a plate to compensate for the decreased bend-resistant mechanical strength. An annular frame 7 for retaining a guide ring 5, a support leg piece 9 and bridge pieces 25 are formed integrally with each other by a metal plate, a portion other than an inner circumferential portion of the frame 7 is drawn toward the rear portion to thereby form a cylindrical portion 19 surrounding the guide ring 5, the bridge pieces 25 extend gently obliquely rearwardly from an edge 21 of the cylindrical portion 19 facing rearwardly, rear ends of the bridge pieces 25 are continuous at a position separate rearwardly from a rod insertion pipe 17, and the bridge pieces 25 are bent so that their cross-sections perpendicular to a longitudinal direction form L-shapes.

4 Claims, 5 Drawing Sheets

TOP GUIDE FOR FISHING ROD

BACKGROUND OF THE INVENTION

The present invention relates to a top guide for a fishing rod, and more particularly to a top guide for a fishing rod having a bridge extending rearwardly from an annular frame holding a guide ring.

A variety of performances are required to a line guide for a fishing rod. Among these, the line guide should be light in weight and high in strength, a line entanglement is easy to be released or the like. These factors are the most important factors. These features are strongly demanded for the top guide to be mounted on the fishing rod.

A bridge is known as one of the means that may respond to these requirements. This bridge is provided to extend in a direction that is slanted from the frame holding the guide ring to reinforce the frame and function as a guide portion for guiding the entangled line in a releasing direction. In many cases, the bridge is provided on the top guide having a size that is greater than the medium one.

A variety of forms of the bridges to be provided on the top guide have been proposed. The cases where a linear material rod-shaped member or a rod made of metal is used for the bridges are disclosed in the Gazettes of Japanese Utility Model Publication No. 9416/1989, Japanese Utility Model Publication No. 33250/1981, Japanese Design Publication Gazette No. 531487 or the like. In the top guide disclosed in these publications, an end of the bridge is brazed to the frame portion or the guide ring, and the other end is overlaid on an outer circumferential surface of the fishing rod body.

Also, the top guides having the bridges made of a metal plate which are similar to the present invention are found in the Gazette of Japanese Utility Model Application Laid-Open No. 41167/1983, Japanese Design Publication Gazette Nos. 531483 and 505945, three of the design patents based upon Japanese Design. In the top guide disclosed in these Gazettes, the bridge is pressed integrally with the frame.

In the top guide provided with the bridge, as a countermeasure for further enhancing the release effect of the line entanglement by the bridge, the slant angle of the bridge might be made gentle as much as possible so that the fishing line is likely to be smoothly moved.

However, in order to make the slant of the bridge gentle without changing the position of the bridge extending from the frame or a height of the frame, it is necessary to extend a length of the bridge. Thus, the weight of the bridge is increased. Also, in order to compensate for the mechanical strength against bending, that decrease in accordance with the increased length of the bridge, it is necessary to increase a thickness of the bridge. As a result, a weight increase would be rather remarkable. In particular, in a type in which the rear end of the bridge is fixed to the fishing rod insertion pipe like a top guide disclosed in Japanese Design Publication Gazette No. 531483, the length of the mounting pipe has to be extended so that the increase in the weight is remarkable and at the same time, the tone (flexibility) of the rod is offset.

On the other hand, in a type in which the metal made rod or the linear material rod-shaped member is used as a bridge, in order to braze one end thereof to the guide ring or the frame part, it is inevitable to generate a step corresponding to a size of the cross-sectional surface of the bridge. Also, in a type in which the bridge is formed integrally with the frame by a metal plate, it is inevitable for a bend portion, that is a continuous section between the bridge and the frame, to expend outwardly of the frame to form an edge. These step and edge would from time to time obstruct the release of the entangled fishing line around the bridge. In particular, since the fishing line is actually wet in fishing, the entangled fishing line is stuck to the bridge. Depending upon the state of the entanglement of the fishing line, there is a fear that the release of the fishing line would be prevented even if the slight step or edge is present.

SUMMARY OF THE INVENTION

In view of the foregoing shortcomings inherent in the above-described prior art, it is an object of the invention to provide a top guide in which, even if a length of a bridge is elongated, there is no fear that the mechanical strength would be decreased and the weight would be increased.

Also, an object of the present invention is to provide a top guide in which neither stepped portion nor edge portion (projection) is formed at a position of a joint between a bridge and a frame.

According to a first aspect of the invention, there is provided a top guide for a fishing rod, comprising: an annular frame for retaining a guide ring; a support leg piece extending from said frame; a rod insertion pipe connected to a front end portion of said support leg piece; a bridge having a pair of right and left bridge pieces extending gradually slant from said frame with rear ends thereof continuous with each other at a position separate rearwardly from said rod insertion pipe; and a mounting foot for positionally fastening the rear end portion of said bridge to the outer circumferential surface of the fishing rod; wherein each of said right and left bridge pieces is bent so that each cross-section thereof perpendicular to a longitudinal direction has at least one angular portion.

According to a second aspect of the invention, the cross-sections of said bridge pieces are L-shapes symmetrical left to right with each other with the angular portions being located outward.

According to a third aspect of the invention, at least said frame, said bridge and said mounting foot are formed integrally with each other by a metal plate, a portion other than an inner circumferential portion of said frame is bent rearwardly to form a cylindrical portion surrounding the guide ring, and the bridge pieces extend from an edge of said cylindrical portion facing rearwardly.

DESCRIPTION OF THE PREFERRED EMBODIMENTS

A top guide for a fishing rod according to an embodiment of the present invention will now be described with reference to the accompanying drawings.

Figure 1:
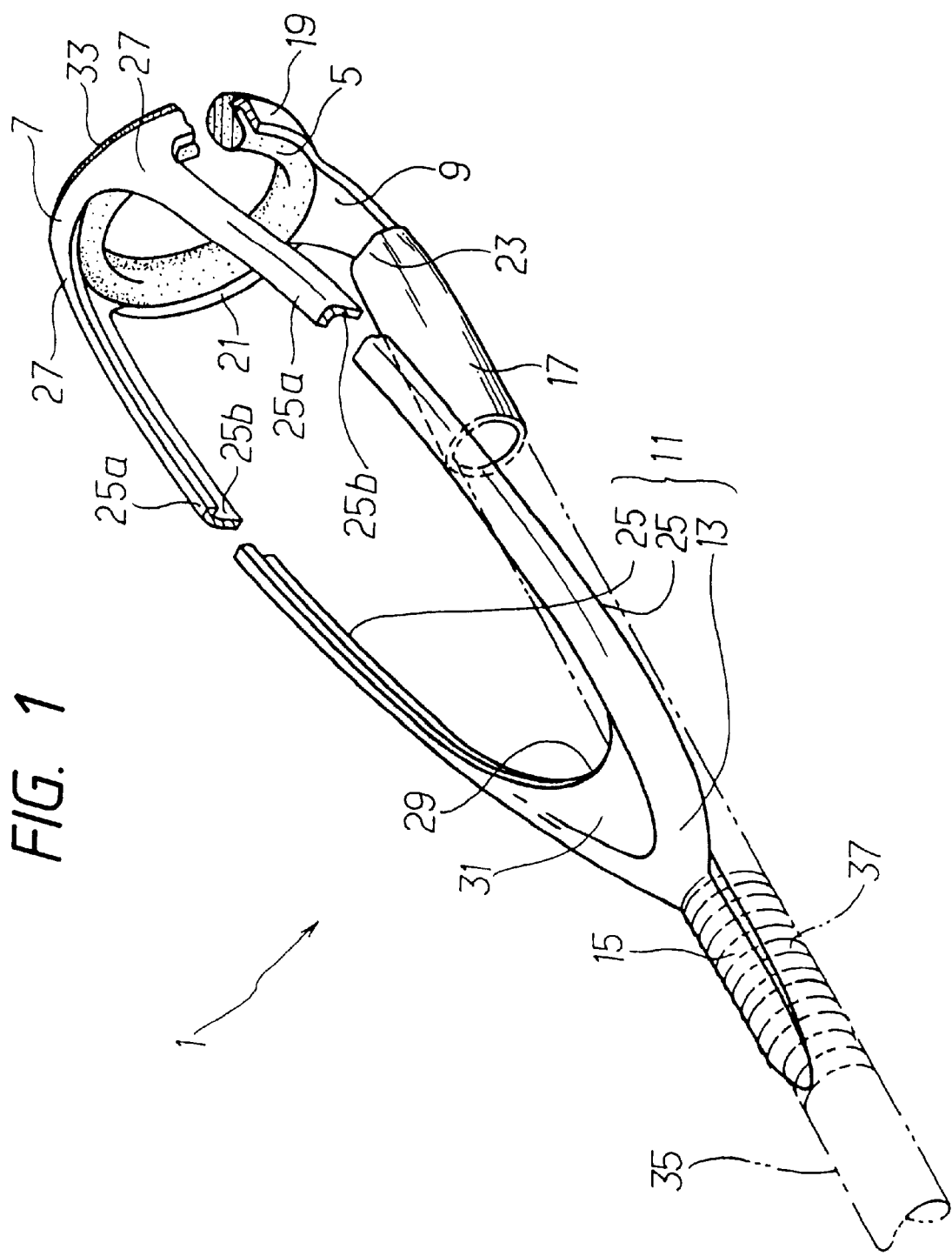
FIG. 1 is a fragmentary perspective view partly taken showing a top guide according to a first embodiment of the invention.
Figure 2:
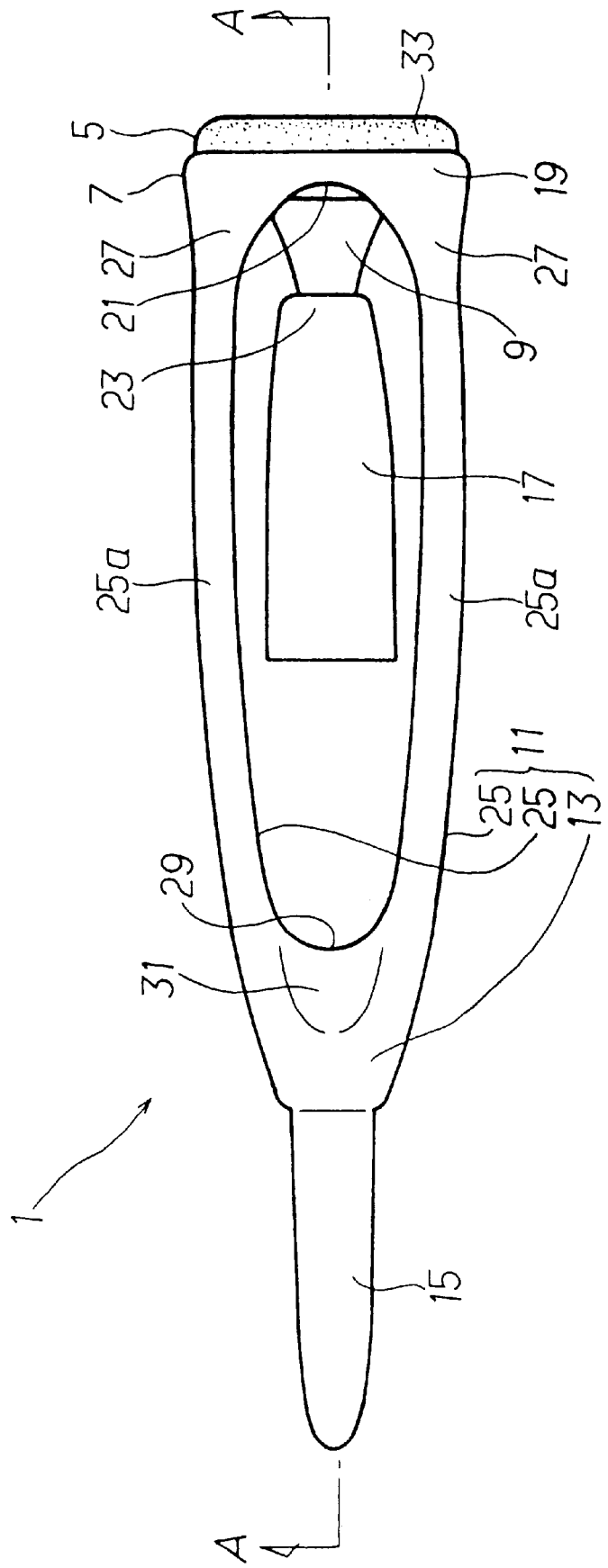
FIG. 2 is a plan view showing a top guide shown in FIG. 1.
Figure 3:
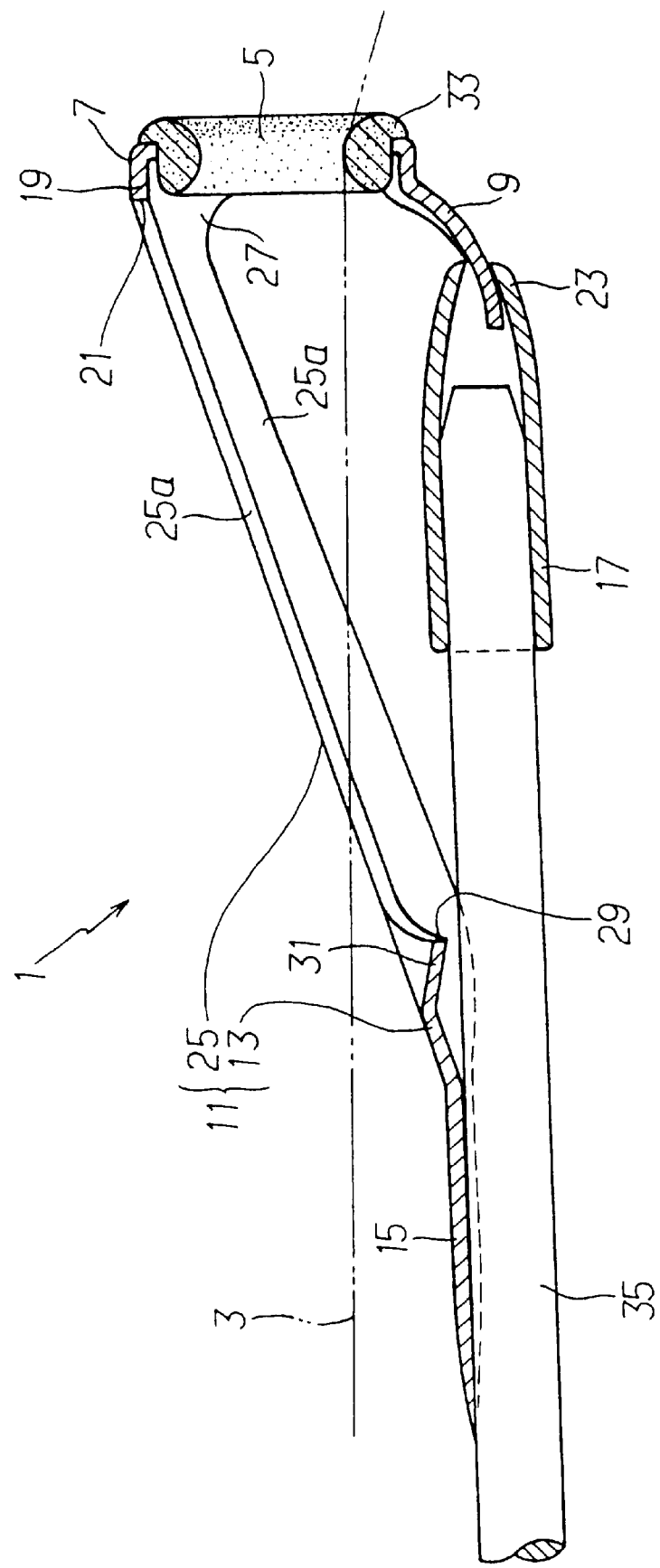
FIG. 3 is a cross-sectional view taken along the line A—A of FIG. 2 in the condition the top guide shown in FIG. 1 is mounted on a fishing line.

FIGS. 1 to 3 show the top guide 1 in accordance with the first embodiment.

The top guide 1 is composed of a guide ring 5 through which a fishing line 3 is caused to pass, a frame 7 for holding a guide ring 5, a support leg piece 9 and a bridge 11 both of which extend from the frame 7, a mounting foot 15 extending from a rear end portion 13 of the bridge 11, and a rod insertion pipe 17.

The frame 7, the support leg piece 9, the bridge 11 and the mounting foot 15 are made integral with each other by pressing a metal plate. The metal plate is made of stainless steel with a thickness of about 0.5 mm.

The frame 7 is substantially in the form a cylinder having an extremely short axial length in comparison with its diameter. Namely, the frame 7 is formed by drawing a portion other than an inner circumferential edge of an annular strip member rearwardly. The drawn portion forms a cylindrical portion 19.

The support leg piece 9 having a substantially tongue shape projects from the rear edge 21 of the cylindrical portion 19. The support leg piece 9 extends from the rear edge 21 so as to form an arcuate curve straightly downwardly.

The rod insertion pipe 17 has a somewhat longer length than the diameter of the frame 7. Its front end portion 23 is pressed to form a flat rectangular sleeve. Under the condition that the forward end portion of the support leg piece 9 is inserted into the front end portion 23 (see FIG. 3), a brazing is effected to this portion. A center axis of the rod insertion pipe 17 is substantially in parallel with a center axis of the frame 7.

The bridge 11 is composed of a pair of right and left bridge pieces 25 and a rear end portion 13. The bridge pieces 25 extend from both sides of a top portion, on the opposite side to the support leg piece 9, of the rear edge 21 of the cylindrical portion 19. In the vertical direction, the bridge pieces 25 are gradually slanted substantially at a constant gradient so that they are shifted gradually downwardly toward the rear side, and in the right and left directions, the bridge pieces 25 are very much gradually bent while being slightly shifted inwardly and merged into a rear portion 13 at their rear ends. The rear end portion 13 is located away rearwardly of the rod insertion pipe 17. The distance between the rear end portion 13 and the rod insertion pipe 17 is somewhat shorter than a length of the rod insertion pipe 17.

A width of each front end portion 27 of the bridge pieces 25 in the circumferential direction of the cylindrical portion 19 is remarkably increased toward the frame 7. Also, the rear end portion 13 of the bridge 11 is formed into a substantially trapezoidal shape expanded forwardly. Its front edge 29 is formed into an arched form continuous with the inner edge of the bridge pieces 25. A region along the front edge 29 of the rear end portion 13 becomes a concave curved portion 31. A bottom portion of the concave curved portion 31 is positioned substantially at a level as high as the top portion of the outer circumferential surface of the rod insertion pipe 17.

The bridge pieces 25 are bent so that cross-sectional shapes perpendicular to the longitudinal direction may form substantially L-shapes symmetrical with each other (see FIG. 1). Each L-shape is composed of a substantially horizontal upper wall 25a and a substantially vertical side wall 25b. Each angular portion is located on the outer side. Accordingly, the bridge pieces 25 have a sufficient bend-resistant strength in the vertical and horizontal directions.

Also, a sharp edge is not present in the outer surface of each bridge piece 25.

Incidentally, since a hight of the side wall 25b is greater than a width of the upper wall 25a, the bendresistant strength in the vertical direction is higher than the bend-resistant strength in the horizontal direction.

The mounting foot 15 is substantially in the form of a penpoint extending rearwardly horizontally from the rear end of the bridge 11.

The guide ring 5 is made of hard material such as ceramic. A flange 33 is provided on the outer circumferential surface of one end portion in the axial direction. The guide ring 5 is press-fitted and attached, with adhesives, into the inner circumferential edge of the frame 7 so that the flange 33 is in contact with the front surface of the frame 7. Most of the portion thereof is surrounded by the cylindrical portion 19.

In the thus constructed top guide 1, the end portion of the fishing rod 35 is inserted and attached, with adhesives, into the rod insertion pipe 17 (see FIG. 3). The mounting foot 15 is bound around the fishing rod 35 by the winding thread 37 to be fixed to the fishing rod 35.

The fishing line 3 is caused to pass through the guide ring 5.

Incidentally, even in the case where the fishing line 3 is close to the fishing rod 35 when the fishing rod 35 is flexed, there is no fear that the fishing line 3 would be brought into contact with the rear end portion 13 of the bridge 11. However, even if the fishing rod 5 is largely flexed, since the front portion of the rear end portion 13 which is the lowest position of the bridge 11 is formed into the concave curved surface 31, there is no fear that the fishing line 3 would be brought into contact with the bridge 11.

Since the top guide 1 is thus constructed, it is possible to readily release the line entanglement. Namely, since the bridge 11 is gradually slanted and extended downwardly rearwardly substantially from the top portion of the frame 7, even if the fishing line 3 is entangled to the bridge 11 as well as the fishing rod 35, where the fishing rod is swung a little before casting the fishing tackle, the fishing line 3 entangled or wound around the bridge 11 is caused to smoothly pass forwardly along the bridge pieces 25. At this time, the fishing line 3 moves as if it rubs on the outer surface of the side wall 25b and the top surface of the upper wall 25a of each bridge piece 25. However, since there is no sharp edge on the top surface and the outer side surface, there is no fear that the fishing line 3 would be cut.

Also, in order to make gentle the slant of the bridge 11, the longitudinal length of the bridge 11 is much longer than that of a bridge of this type conventional top guide. Since the bridge pieces 25 have a high mechanical strength by bending as mentioned above, it is possible to considerably thin the material for the bridge 11. Accordingly, even if the top guide is large in size, it is possible to avoid the increase of the weight.

Since the front end of the bridge 11 extends directly from the rear edge of the cylindrical portion 19 of the frame 7, there is no projection that obstructs the release of the fishing line 3 entangled around the bridge 11 at all.

Figure 4:
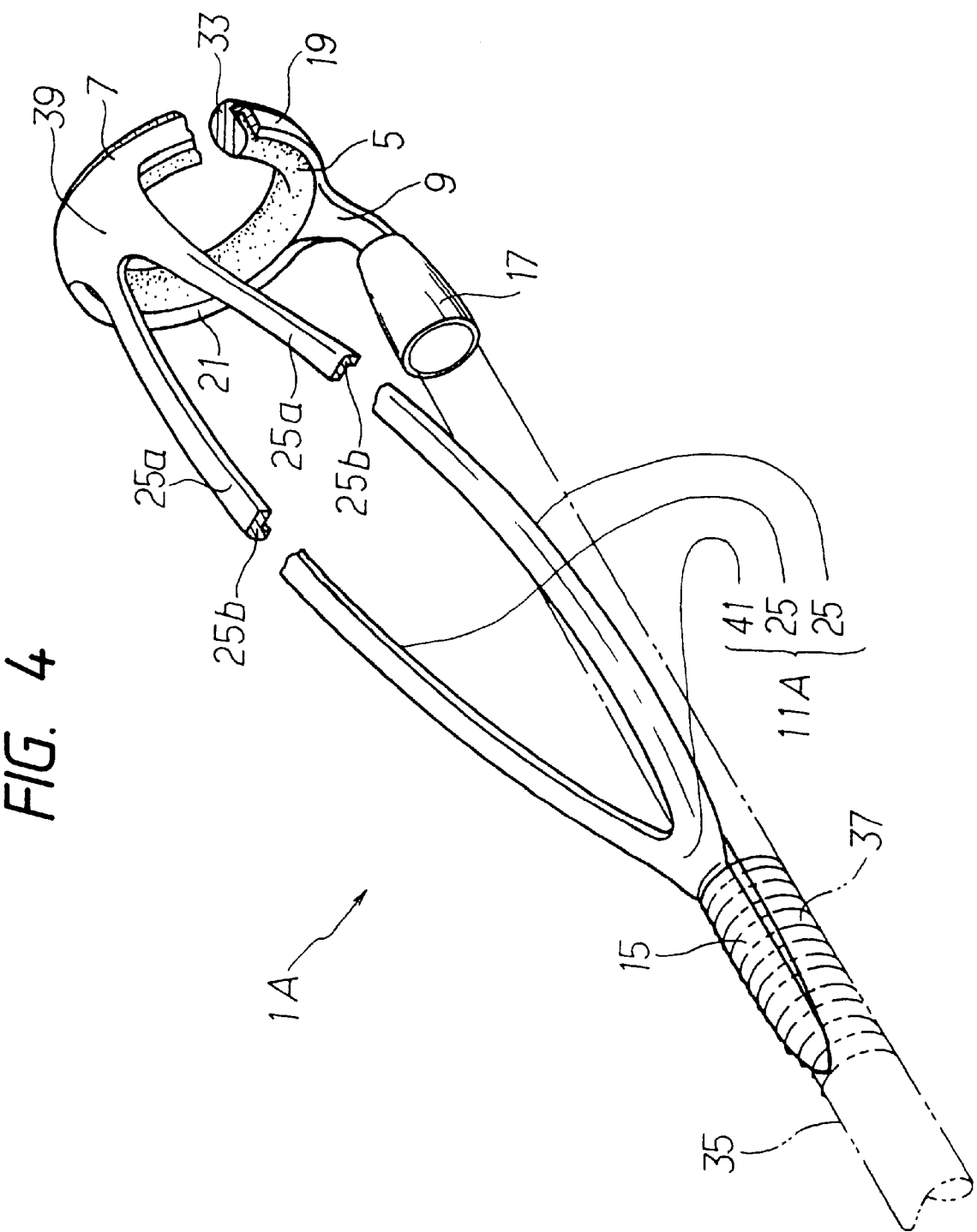
FIG. 4 is a fragmentary perspective view partly taken showing a top guide according to a second embodiment of the invention.

FIG. 4 shows a top guide 1A in accordance with a second embodiment of the invention.

The main distinctions between the top guide 1A of this embodiment and the top guide 1 in accordance with the first embodiment are only the shapes of the longitudinal both end portions of the bridge. Accordingly, the explanation will be made only as to the above-described differences. The same reference numerals are used to indicate the like members or components and the explanation therefor will be omitted. Such use of the reference numbers will apply in a third embodiment to be described later.

In the top guide 1A, the top portion of the cylindrical portion 19 on the opposite side to the support leg piece 9 is projected rearwardly to some extent to form a plate portion 39 with its extra portion. The right and left bridge pieces 25 extend from the rear end of the plate portion 39. Also, the rear end portion 41 of the bridge 11A has no remarkable expansion in its face.

Accordingly, the material for the bridge 11A of the top guide 1A is small in quantity in comparison with the bridge 11 of the above-described top guide 1. Corresponding to this, the weight of the material is decreased so that the bridge is light in weight.

Incidentally, in each bridge piece 25 in this embodiment, a width of a upper wall 25a is greater than a dimension of a side wall 25b thereof so that the priority of the bend-resistant strength is given to the horizontal direction.

Figure 5:
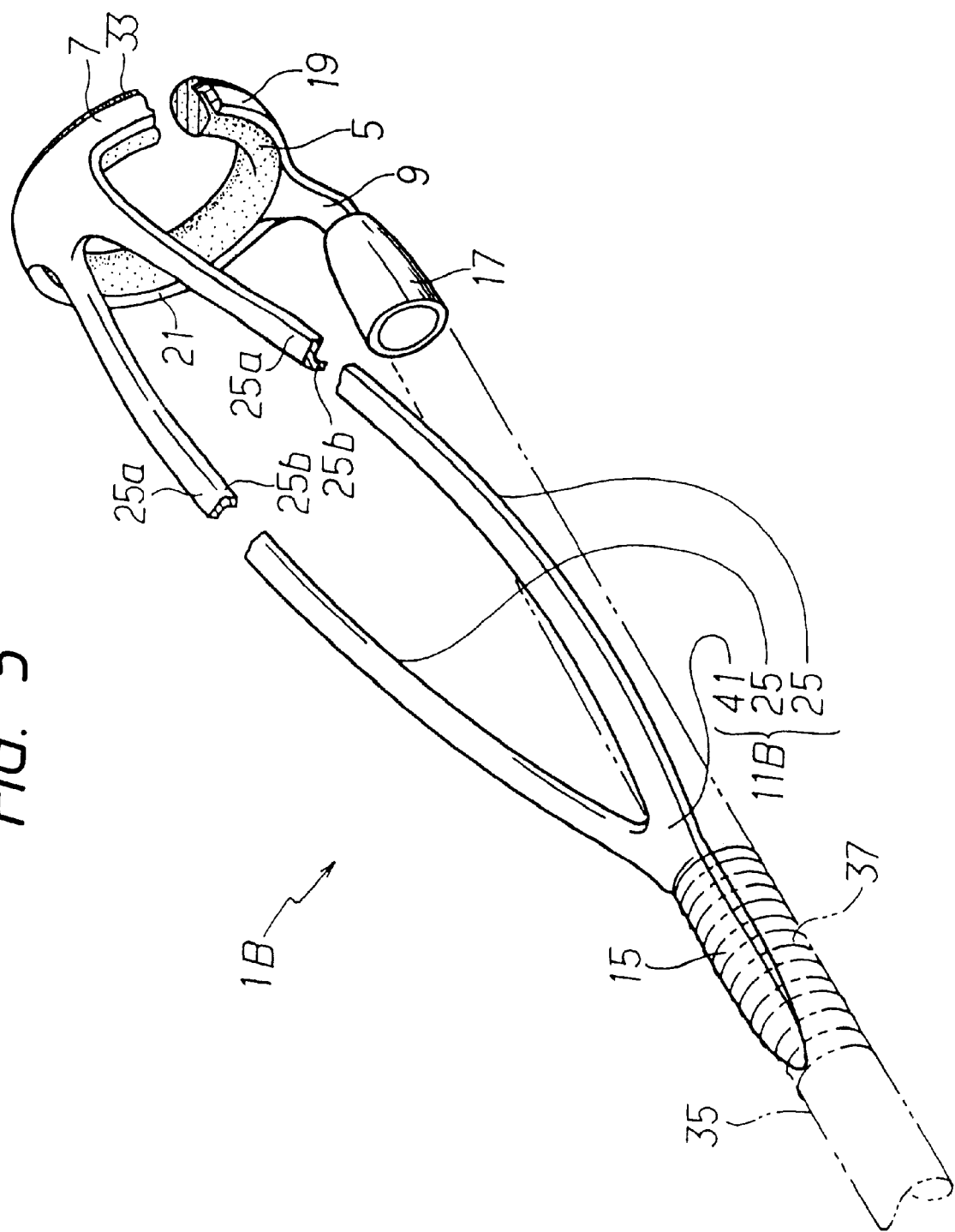
FIG. 5 is a fragmentary perspective view partly taken showing a top guide according to a third embodiment of the invention.

FIG. 5 shows a top guide 1B in accordance with a third embodiment of the invention.

The main difference between the top guide 1B of this embodiment and the top guide 1A in accordance with the second embodiment lies only in the cross-section of the bridge.

Reference character 11B indicates the bridge. The cross-sections of bridge pieces 25 of the bridge 11B perpendicular to the longitudinal direction are substantially L-shapes symmetrical with each other in back-to-back relation. There is no problem in mechanical strength of the bridge 11B even with such a structure.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

For example, in the embodiments, the cross-sections of the bridge perpendicular to the longitudinal direction are the L-shapes. However, needless to say, the cross-sections are not limited to the exact L-shapes. If the bridge has at least one bent portion, it is not always necessary to limit the shapes to the L-shape.

Also, in each of the foregoing embodiments, the present invention is applied to the fishing rod on which the reel is located above the rod. However, it is possible to apply the invention to a top guide mounted on the fishing rod on which the reel is mounted below the rod. In this case, the up-and-down direction used in the specification may simply be reversed.

As described above, according to the present invention, since the bridge pieces are gradually slanted from the frame and extend rearwardly, it is possible to release smoothly the fishing line entangled. Then, the length of each bridge piece is slightly increased since the gradient of the slant is gentle. However, since the crosssection of each bridge piece perpendicular to the longitudinal direction has at least one angular portion, it is possible to thin the thickness of the plate without decreasing the mechanical strength. Accordingly, it is unnecessary to increase the weight.

According to a second aspect of the invention, since the cross-sections of two bridge pieces form substantially the L-shapes symmetrical in the right and left direction so that the angular portions are located outside, it is possible to sufficiently ensure the mechanical strength of the bridge pieces, and at the same time, it is possible to work the bridge pieces because the shapes are relatively simple. Also, since no sharp edge is present in the outer surfaces and the angular portions of the bridge pieces are located outside, there is no fear that the fishing line that slides while rubbing the outer surfaces would be cut.

According to a third aspect of the invention, since the bridge pieces extend rearwardly from the edge directed to the rear portion of the cylindrical portion of the frame, although the frame and the bridge pieces are formed integrally by bending the metal plate, there is no projection that would prevent the release the entangled fishing line at the position of the joint of the bridge pieces and the frame.

What is claimed is:

1. A top guide for a fishing rod, comprising an annular frame for holding a guide ring; a support leg piece extending from said frame; a rod insertion pipe connected to a front end portion of said support leg piece; a bridge having a pair of right and left bridge pieces extending gradually slanted from said frame with rear ends thereof continuous with each other at a distance rearwardly from said rod insertion pipe; and a mounting foot for positionally fastening the rear end portion of said bridge to the outer circumferential surface of the fishing rod, characterized in that each of said right and left bridge pieces is bent so that each cross-section thereof perpendicular to a longitudinal direction defines at least one angle.

2. The top guide according to claim 1, characterized in that the cross-sections of said bridge pieces are L-shapes symmetrical left to right with each other with the angle being located outward.

3. The top guide according to claim 1, characterized in that at least said frame, said bridge and said mounting foot are formed integrally with each other by a metal plate, a portion other than an inner circumferential portion of said frame is bent rearwardly to form a cylindrical portion for holding the guide ring, and the bridge pieces extend from an edge of said cylindrical portion facing rearwardly.

4. The top guide according to claim 2, characterized in that at least said frame, said bridge and said mounting foot are formed integrally with each other by a metal plate, a portion other than an inner circumferential portion of said frame is bent rearwardly to form a cylindrical portion for holding the guide ring, and the bridge pieces extend from an edge of said cylindrical portion facing rearwardly.

* * * * *